F. J. KING.
FLOOR SCRAPER.
APPLICATION FILED MAR. 27, 1908.
931,432.
Patented Aug. 17, 1909.
2 SHEETS—SHEET 1.
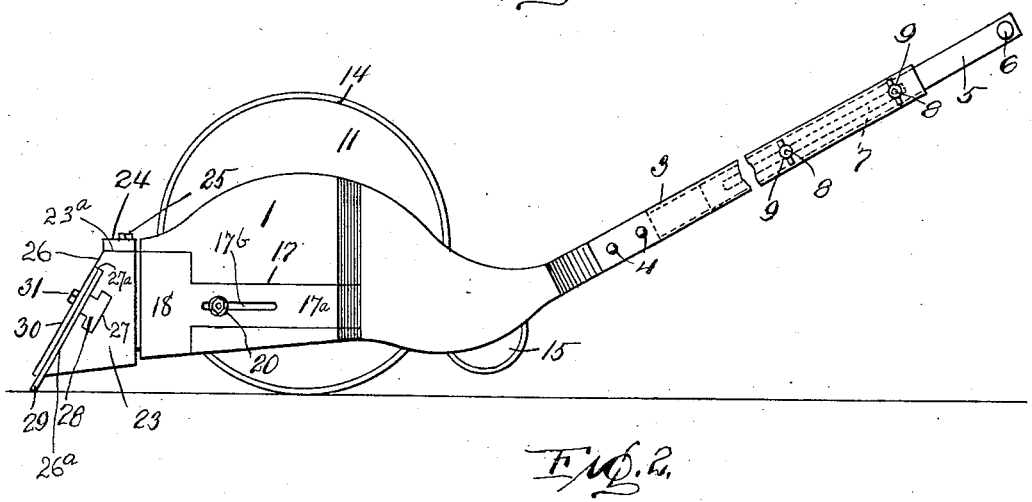
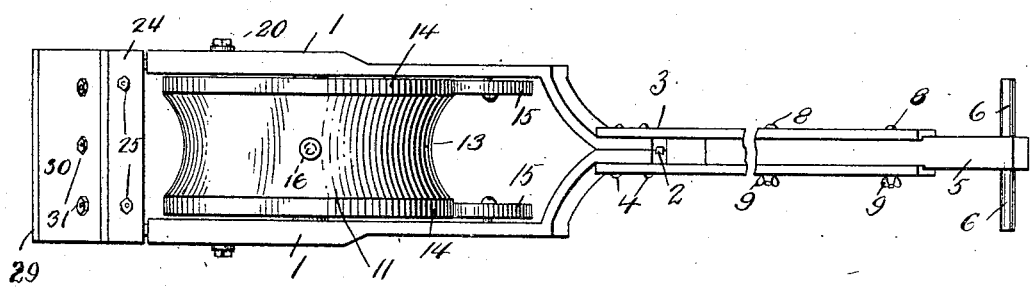
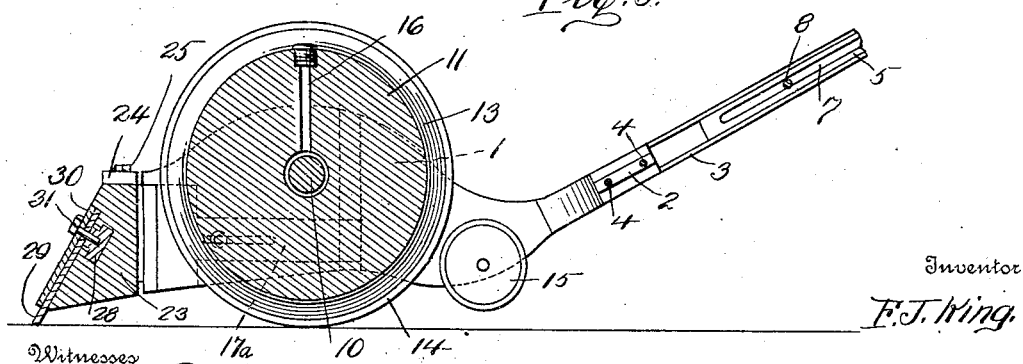

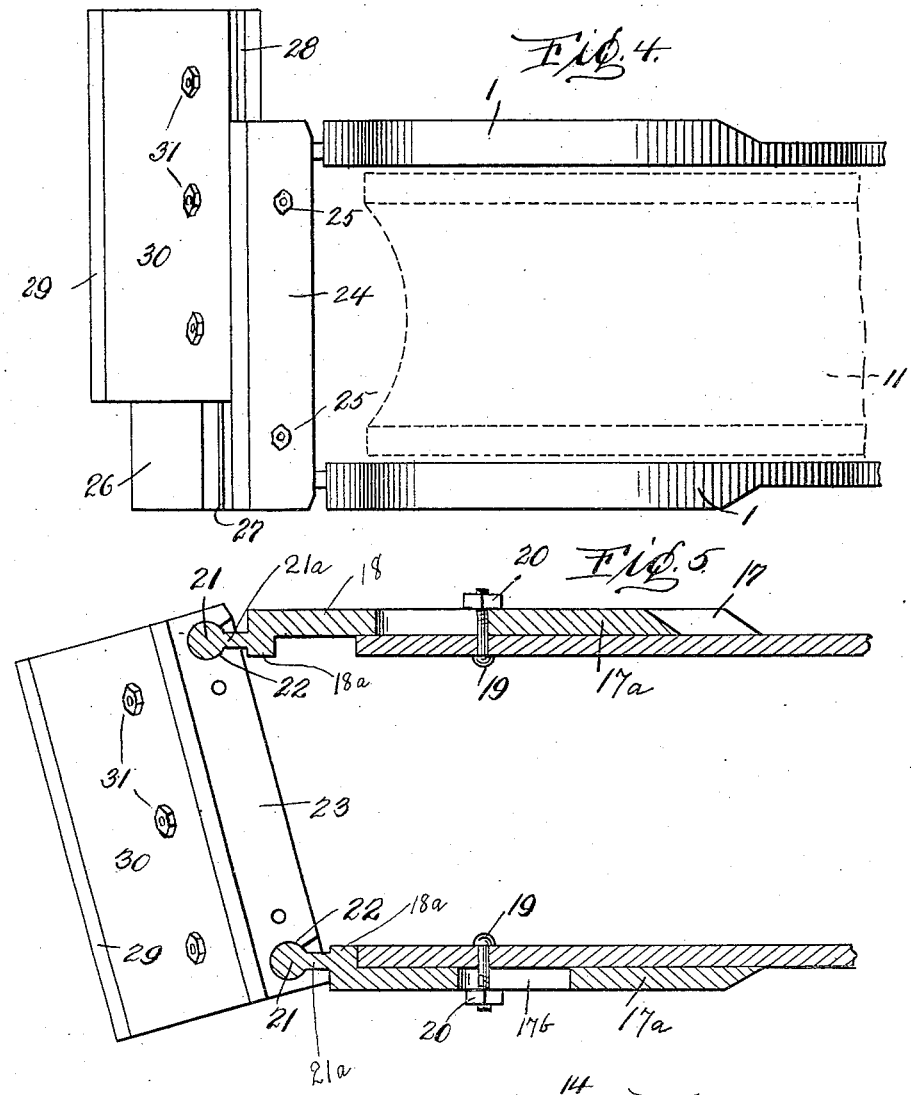

UNITED STATES PATENT OFFICE.

FRANK J. KING, OF WAVERLY, WEST VIRGINIA.

FLOOR-SCRAPER.

No. 931,432.  Specification of Letters Patent.  Patented Aug. 17, 1909.

Application filed March 27, 1908. Serial No. 423,660.

*To all whom it may concern:*

Be it known that I, FRANK J. KING, a citizen of the United States of America, residing at Waverly, in the county of Wood and State of West Virginia, have invented certain new and useful Improvements in Floor-Scrapers, of which the following is a specification, reference being had therein to the accompanying drawing.
This invention relates to a floor scraper, and the object of my invention is, to provide a novel device for expeditiously scraping a floor, without gouging or marring the floor while the device is in operation.
To this end, I have devised a portable device having a scraper blade that can be adjusted to facilitate the operation of scraping a floor contiguous to a wall or door frame, the blade also being adjustable for scraping against the grain of the wood forming the floor.

The device is provided with an adjustable handle and with means for supporting the device and maintain the scraper blade out of engagement with the floor, when not in operation.

In providing my portable device, I aim to obviate the necessity of workmen sitting or kneeling upon the floor, thus preventing workmen from assuming a tiresome and uncomfortable position, as is necessary with hand scraping instruments or devices.

My invention will be presently described in detail and reference will now be had to the drawing forming a part of this specification, wherein, Figure 1 is an elevation of my floor scraper partly broken away, Fig. 2 is a plan of the same, Fig. 3 is a longitudinal sectional view of a portion of the scraper, Fig. 4 is an enlarged plan of a portion of the scraper illustrating the cutting blade in an adjusted position, Fig. 5 is a horizontal sectional view of a portion of the scraper illustrating another adjusted position of the cutting blade, and Fig. 6 is a cross sectional view of the floor scraper.

In the accompanying drawings, 1 designates side frames having their rear ends bent and connected together by a tongue 2, channel bars 3 and hold fast devices 4. The channel bars 3 constitute a housing for an adjustable bar 5, the latter carrying a handle on its outer end. The bar 5 is provided with a longitudinal slot 7 through which extends bolts 8 carrying winged nuts 9. The bolts 8 also extend through the channel bars 3, the winged nuts 9 being positioned upon the bolts 8 exteriorly of one of the channel bars
3. By loosening the nuts, the handle bar 5 can be longitudinally adjusted with respect to the channel bars 3. After the bar 5 has been adjusted, the ends 9 are jointed and the bar 5 is securely held in the position to which it has been adjusted.

Between the side frames 1 is fixed a transverse axle 10 carrying revoluble wheel 11. Roller bearings 12 are provided for the wheel 11. The latter is also provided with rubber tires 14 for supporting it upon the floor as illustrated in Figs. 1 and 3.

The inner sides of the frame 1 are provided with auxiliary rubber tired wheels 15, these wheels supporting the device upon a floor and maintaining the cutter plate thereof in an elevated position.

The large wheel 11 is provided with a suitable lubricant port 16 to permit of the axle 10 and the bearing rollers 12 being lubricated.

The outer face of each side of the frame 1 is formed at a point below the longitudinal center thereof with a longitudinally extending groove 17 which extends from a point removed from the rear end to the front edge of the side of the frame. Mounted in each of said grooves 17 is the contracted end 17$^a$ of a longitudinally adjustable scraper head carrying plate 18. Each of these latter plates has its forward end bent inwardly at right angles as at 18$^a$, the said angular portion 18$^a$ is arranged at the front of the forward edge of a side of the frame 1 and terminates in a vertically extending tongue embodying an enlarged cylindrical outer end 21 and a contracted neck portion 21$^a$ which is formed integral with the angular portion 18$^a$. Each of the tongues is arranged in parallelism with respect to the forward edge of one side of the frame 1. The contracted rear end 17$^a$ of each of the plates 17 is formed with a longitudinally extending slot 17$^b$ through which extends a bolt 19 carrying a nut 20, the bolts 19 being connected to the frame 1. By the providing of the bolts 19, nuts 20, and the slotted rear ends 17$^a$, provision is made whereby the scraper head carrying plate 18 can be longitudinally adjusted and secured in said adjusted position, the adjustment of one plate 18 being independent of the other.

The scraper head which is indicated by the reference character 23 is formed with a flat upper face 23ª and an inclined or beveled forward face 26, having an inverted T-shaped groove 27 extending in the direction of its length. The head 23 in its rear portion is provided with a pair of keyhole shaped sockets 22 extending vertically and which are adapted to receive the tongues of the plates 18 whereby the scraper head 23 is adjustably coupled with the frame 1. By the providing of the keyhole shaped sockets 22 to receive the tongues of the plates 18 provision is had not only for adjusting the scraper head 23 longitudinally with respect to the frame 1, but also at various angles as will be evident and as clearly shown in Fig. 5. To arrest vertical movement of the tongues when positioned in the sockets 22 a plate 24 is attached to the top of the head 23 by the holdfast device 25.

The scraper head 23 has its front face 26 cut away to form a seat 26ª for the scraper blade 29. The cutting away of the front face 26 provides a shoulder 27ª against which the top edge of scraper blade 29 abuts to arrest upward movement of said blade. The latter is of a width as to project below the head 23 as clearly shown in Figs. 1 and 3. The blade 29 is coupled with the head 23 through the medium of a face plate 30, holdfast devices 31 and a T-shaped member 28, the latter is mounted in the groove 27 and engaged by hold fast devices 31 which extend through the face plate 37 and blade 29. The plate 30 abuts against the shoulder 27ª and is of less width than the blade 29 so as to allow of the projecting end of the blade 29 to be somewhat resilient.

Assuming that the handle bar 5 has been adjusted to permit of a workman moving the device back and forth over the floor, the pull stroke of the device causes the blade 29 to scrape the floor. The tendency of a pull stroke is to elevate the handle bar, consequently, lower the scraper head 23 and cause the blade 29 to rest upon and scrape the floor. The return or push stroke of the device is made with the wheels 15 resting upon the floor, whereby the head 23 will be elevated and will retain the blade 29 out of engagement with the floor.

In adjusting the plate to the position illustrated in Fig. 4 of the drawings, the floor adjacent to a wall or door frame can be scraped, without the device contacting with the wall. When the scraper blade fails to take hold of a floor, the scraper head 23 can be adjusted to the position illustrated in Fig. 5 of the drawings, this being accomplished by shifting one of the plates 18. By adjusting the plates 19, the scraper head 23 can be placed at any desired angle with relation to the side frames 1.

My device can be made of various kinds of material and of any desired size. Such variations of the invention as fall within the scope of the appended claims can be made without departing from the spirit of the invention.

Having now described my invention, what I claim, is:

1. A floor scraper comprising side frames, a large wheel journaled between said frames, a small wheel carried by each frame, channel bars secured to said side frames, a handle bar adjustably mounted in said channel bars, longitudinally adjustable plates mounted in the outer sides of said frames and provided with tongues each having a cylindrical outer portion and a contracted neck, a scraper head provided with keyhole shaped sockets for the reception of said tongues whereby said head is adjustably coupled to said plates, a tongue slidably mounted in said scraper head, and a scraper connected to said tongue.

2. A floor scraper comprising side frames, wheels revolubly arranged between said side frames, a handle bar adjustably supported from said side frames, longitudinally adjustable plates mounted in said side frames, a scraper head, means carried by said plates and engaging in the scraper head whereby the latter is coupled with the plates and is capable of a longitudinal and angular adjustment, a tongue slidably mounted in said cross head, and a scraper blade detachably connected to said tongue.

3. A floor scraper comprising side frames, wheels arranged therebetween, a handle bar connected with the frames, a scraper head provided with a plurality of keyhole shaped sockets, longitudinally adjustable plates carrying tongues engaging in said sockets whereby the head is coupled to the frame and is capable of a longitudinal and angular adjustment, and a scraper blade connected to said head.

4. A floor scraper comprising side frames, wheels arranged therebetween, a handle bar connected with the frames, a scraper head provided with a plurality of keyhole shaped sockets, longitudinally adjustable plates carrying tongues engaging in said sockets whereby the head is coupled to the frames and is capable of a longitudinal and angular adjustment, a scraper blade connected to said head, and means secured to the head to arrest the vertical movement of the tongues.

5. A floor scraper comprising side frames, wheels arranged therebetween, a handle bar connected with the frames, a scraper head provided with a plurality of keyhole shaped sockets, longitudinally adjustable plates carrying tongues engaging in said sockets whereby the head is coupled to the frame and is capable of a longitudinal and angular adjustment, a scraper blade, and a tongue and groove connection between the blade and the head.

6. A floor scraper comprising side frames, wheels arranged therebetween, a handle bar connected with the frames, a scraper head provided with a plurality of keyhole shaped sockets, longitudinally adjustable plates carrying tongues engaging in said sockets whereby the head is coupled to the frame and is capable of a longitudinal and angular adjustment, a scraper blade, a tongue and groove connection between the blade and the head, and a face plate secured to the head forwardly of and of less width than the blade.

7. A floor scraper comprising side frames, wheels arranged therebetween, a handle bar connected with the frames, a scraper head provided with a plurality of keyhole shaped sockets, longitudinally adjustable plates carrying tongues engaging in said sockets whereby the head is coupled to the frames and is capable of a longitudinal and angular adjustment, a scraper blade, a tongue and groove connection between the blade and the head, and means secured to the top of the head to arrest vertical movement of said tongues when coupling the head with said plates.

8. A floor scraper comprising side frames, wheels journaled in said frames, a handle attached to the frames, a scraper head provided with a plurality of vertically extending sockets, longitudinally adjustable side plates provided with angular ends arranged forwardly of said side frames and terminating in vertically disposed tongues engaging in said sockets for coupling the head to the side frames, and a scraper blade connected to said head.

9. A floor scraper comprising side frames, wheels journaled in said frames, a handle attached to the frames, a scraper head provided with a plurality of vertically extending sockets, longitudinally adjustable side plates provided with angular ends arranged forwardly of said side frames and terminating in vertically disposed tongues, engaging in said sockets for coupling the head to the side frames, a scraper blade connected to said head, and means secured to said head to arrest vertical movement of said tongues.

10. A floor scraper comprising side frames, wheels journaled in said frames, a handle attached to the frames, a scraper head provided with a plurality of vertically extending sockets, longitudinally adjustable side plates provided with angular ends arranged forwardly of said side frames and terminating in vertically disposed tongues engaging in said sockets for coupling the head to the side frames, a scraper blade connected to said head, means secured to said head to arrest vertical movement of said tongues, and a face secured to the head forwardly of less width than said blade.

In testimony whereof I affix my signature in the presence of two witnesses.

FRANK J. KING.

Witnesses:
J. M. FRAZIER,
JOHN YATES.